June 2, 1970 L. B. BROWDER 3,515,470
CONTROL INFORMATION RECORDING AND SENSING METHODS AND APPARATUS
Filed Nov. 20, 1967 3 Sheets-Sheet 1

INVENTOR.
LEWIS B. BROWDER
BY
ATTORNEY.

June 2, 1970  L. B. BROWDER  3,515,470

CONTROL INFORMATION RECORDING AND SENSING METHODS AND APPARATUS

Filed Nov. 20, 1967  3 Sheets-Sheet 2

INVENTOR.
LEWIS B. BROWDER
BY Raymond C. Andrus
ATTORNEY.

United States Patent Office 3,515,470
Patented June 2, 1970

3,515,470
CONTROL INFORMATION RECORDING AND SENSING METHODS AND APPARATUS
Lewis B. Browder, Altadena, Calif., assignor to Bell & Howell Company, Chicago, Ill., a corporation of Illinois
Filed Nov. 20, 1967, Ser. No. 684,253
Int. Cl. G03b 21/50, 21/52
U.S. Cl. 352—92
13 Claims

ABSTRACT OF THE DISCLOSURE

Methods and apparatus for providing and for sensing light-transmitting control markings between sprocket holes of elongated information carriers.

BACKGROUND OF THE INVENTION

Field of the invention

The subject invention relates to information recording and reproduction and, more particularly, to methods and apparatus for providing, and for sensing, control markings between sprocket holes of elongated information carriers.

Description of the prior art

Proposal to provide control markings on elongated information carriers having sprocket holes are of a very long standing.

Some of these proposals have the disadvantage that the various control markings, slots or notches consume considerable space on the film or elongated information carrier. This is even true with respect to those proposals which provide marginal notches on the film, since such notches weaken the film, requiring the presence of extended areas of solid film material adjacent the notches, particularly if the film is to be run at relatively high speed.

In practice, opeque markings are generally easier to work with than electrically conducting spots, since opaque markings may conveniently be sensed by a photocell, while electrically conducting spots require more elaborate sensing equipment, such as relatively delicate electric contact arrangements. Also, opaque markings are preferable over electrically conducting spots and light-reflecting markings, since they may be more readily provided on the film by photographic exposure.

However, opaque markings are still inconvenient for a number of reasons.

For instance, in the ordinary processing of photographic materials, such as by a negative-to-positive printing method or a reversal development technique, areas which have been exposed to light appear as light areas in the developed film. Special procedures would thus be necessary, if the markings were to be produced by a light exposure of the film during the provision of the markings, and if the markings were to appear as opaque areas on the processed film.

In principle, one could attempt to circumvent this problem by exposing the sprocket hole margin of the photosensitive film with a lamp as long as no control marking is to be provided, and to deenergize this lamp temporarily for the provision of a control marking, so as to provide for an unexposed area which would be opaque on the fully developed film. This would, however, raise the further problem that the lamp would have to be energized for longer periods of time, bringing about a higher energy consumption that is of particular significance in the case of portable battery-powered equipment. Also, if light from the lamp should accidentally leak onto the image portion of the film, most of the image frames would be adversely affected, while a short light flash from the lamp during the provision of a transparent marking could only affect some one to three image frames at a time.

SUMMARY OF THE INVENTION

The subject invention overcomes the above mentioned problems and, from one aspect thereof, resides in apparatus for sensing control markings located between sprocket holes of an elongated intelligence carrier.

According to the invention, this apparatus includes the improvement comprising first means for producing electric signals in response to the above mentioned control markings. These first means are of a type tending to produce spurious electric signals in response to the above mentioned sprocket holes, and the apparatus under consideration further includes second means combined with the defined first means for suppressing a response of the first means to the sprocket holes.

Preferred embodiments of this apparatus will become apparent as this description proceeds.

Apparatus according to the subject invention also permit the sensing of control markings which, rather than being located between sprocket holes, are located to the side of sprocket holes, or are located adjacent to light-transmitting regions other than sprocket holes.

Accordingly, the invention, from another aspect thereof, provides apparatus for displaying pictorial presentations recorded on film provided with recurring light-transmitting regions, such as sprocket holes or recurring synchronization marks, and for sensing control markings located on the film adjacent some of these light-transmitting regions.

According to the invention, this apparatus includes the improvement comprising means for intermittently advancing the film thereby serially moving the control markings and the light-transmitting regions past a predetermined location, sensing means including means situated at the predetermined location for sensing the control markings at this predetermined location, with these sensing means being of a type tending to respond to the above mentioned light-transmitting regions during a movement of these regions past the predetermined location, and means combined with the sensing means for precluding the sensing means from responding to the light-transmitting regions.

From another aspect thereof, the invention resides in the method of providing light-transmitting control markings between light-transmitting sprocket holes of an elongated information carrier.

From yet another aspect thereof, the invention resides in an elongated information carrier having light-transmitting control markings between light-transmitting sprocket holes.

From yet a further aspect thereof, the invention resides in camera apparatus for photographing pictorial impressions on photographic film having sprocket holes.

This camera apparatus includes the improvement comprising means for selectively exposing the film between sprocket holes thereof to provide control markings on the film which are light-transmitting after the film has been developed so that unexposed film portions between the sprocket holes are opaque.

BRIEF DESCRIPTION OF THE DRAWINGS

The invention and various aspects thereof will become more readily apparent from the following detailed description of preferred embodiments of the invention, illustrated by way of example in the accompanying drawings, in which.

DESCRIPTION OF THE PREFERRED EMBODIMENT

Figure 1:
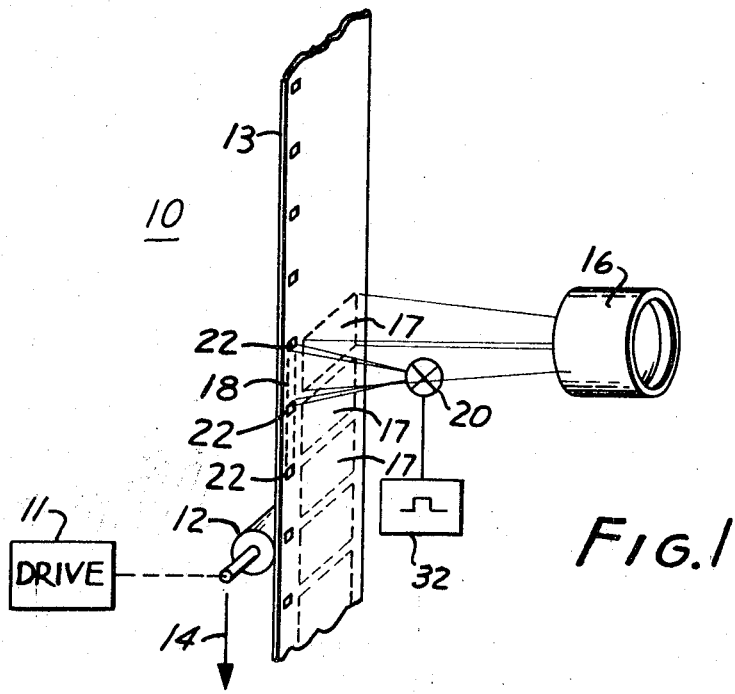
FIG. 1 is a perspective view of pertinent parts of a camera apparatus including a preferred embodiment of the invention.

The camera apparatus 10 shown in FIG. 1 includes a drive 11 acting through a symbolically illustrated mechanism 12 for advancing an unexposed motion picture film 13 in the direction of an arrow 14. This camera apparatus may be of an intermittent-film-motion type, or of a continuous-film-motion type. At any rate, the film drive 11 and film advance mechanism 12 may be of a conventional construction. The same applies to other components, such as shutter means and film gates which are normally found in motion picture cameras, and which are thus not illustrated in FIG. 1.

During the filming of a motion picture sequence, pictorial impressions are picked up by a camera objective 16 and are photographed in image frames 17 on the film 13 in a conventional manner.

During the filming of motion picture sequence, latent control markings 18 are provided by a lamp 20 on the film 13. The lamp 20 is positioned such that the control markings are recorded between sprocket holes 22 of the film 13. No undue space is, therefore, consumed by the markings 18 on the film 13, since the spaces between sprocket holes are present on the film at any rate.

Since the film 13 is photosensitive over its entire area, the latent control markings are produced by an exposure of the film between the sprocket holes 22 by the lamp 20. In this manner, the markings 18 will appear as light-transparent areas on the film 13, if the regions between the sprocket holes 22 are developed in the same manner as the image frames 17 on the film. To this effect, the film margin where the sprocket holes 22 are located is exposed in the same manner as the frames 17 during the processing the film. When the film is developed in a negative-to-positive process this may be accomplished by avoiding a masking of this film margin, while the positive film is printed by means of light from the negative form, whereupon this margin in the fully developed film will be opaque, except for the areas where control markings of the type of marking 18 shown in FIG. 1 are located. The control markings and the sprocket holes are, therefore, light transparent against a dark background, as is indicated at 24 in FIG. 5, which shows the film 13 after a photographic development thereof.

The contrasting effect just described may also be produced if the film is developed by a reversal process which includes an exposure to light of the film at a predetermined instance during chemical processing. In this case, a light exposure of the film margin during the reversal process will darken the film margin except for the sprocket holes and the control markings 18 which will become light transparent.

It will now be recognized that the provision of transparent control markings between sprocket holes according to the invention is accomplished in a more convenient, advantageous and efficient manner than the provision of opaque, light-reflecting or electrically conductive markings between sprocket holes, as proposed by the prior art.

Figure 1A:
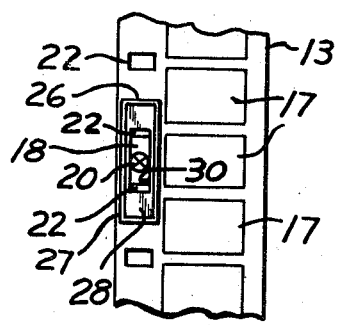
FIG. 1A is an elevation, on a somewhat enlarged scale, of a component which may be employed in the apparatus of FIG. 1.

When viewing FIG. 1, it will be recognized that masking means may be necessary to avoid an exposure of the film frames 17 by the lamp 20. An example of a suitable mask 26 is shown in FIG. 1A. This mask has four walls 27 within which the lamp 20 is located. The mask 26 further has a bottom wall 28 which is located adjacent the film 13 and which defines an elongated slot 30 through which regions of the film between sprocket holes 22 are exposed by the lamp 20 to provide for the control markings 18.

The above mentioned prior art shows various instances in which the provision of control markings on motion picture film or similar elongated information carriers is desirable. For present purposes, it may be assumed that the lamp 20 shown herein is for the purpose of providing markings on the film to indicate the start of sound accompaniment sequences which are recorded on a medium separate from the film.

Accordingly, control means 32 are shown in FIG. 1 which energizes the lamp 20.

The remaining FIGS. 2 to 5 illustrate apparatus for sensing the control markings 18 from the developed film 13. It will be recognized that these apparatus are also capable of sensing control markings which have been produced by means other than the apparatus shown in FIGS. 1 and 1A. To name an example, control markings of the type shown at 18 in FIGS. 2 to 5 may also be provided on the film 15 after the development thereof, such as by a mechanical removal of predetermined opaque regions between selected ones of the sprocket holes 22.

Figure 2:
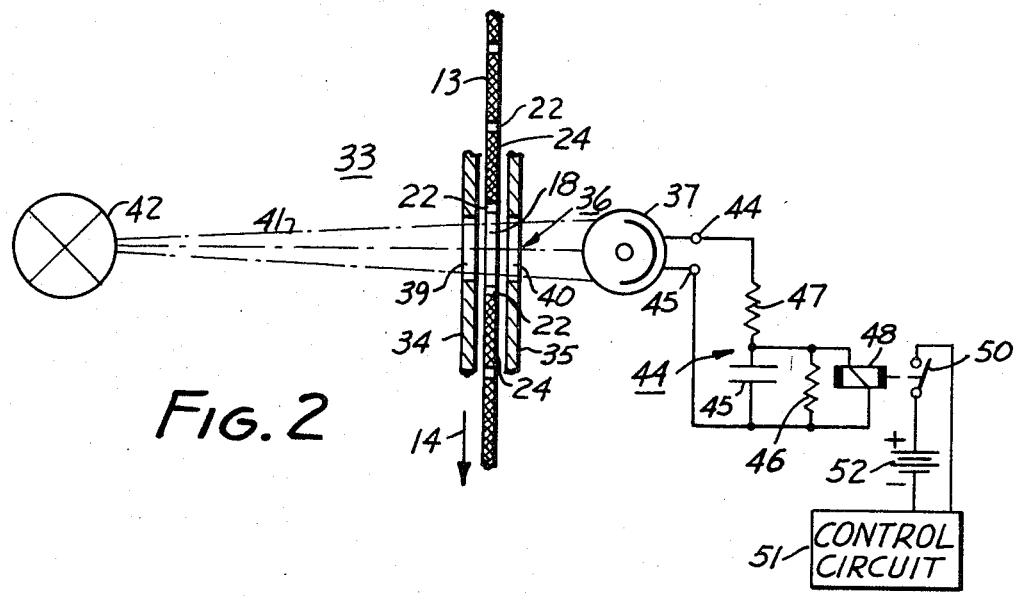
FIG. 2 illustrates a side view of pertinent parts of a projector, and a schematic of a circuit in accordance with a preferred embodiment of the invention.

In the apparatus 33 illustrated in FIG. 2, the developed film 15 is longitudinally moved between a pair of plates 34 and 35 so that the sprocket holes 22 and a control marking 18 are serially transported through a region 36.

A photocell 37 is located at the region 36, and the plates 34 and 35 have apertures 39 and 40 at that region, so that the photocell 37 may be exposed to a beam of light 41 produced by a light source 42. The photocell 37 is designed to provide an electric output signal at its terminals 44 and 45 in response to the light beam 41.

The plates 34 and 35 may form part of a conventional motion picture projector in which the film 15 is intermittently advanced in a conventional manner for the display of motion picture sequences recorded on the film. The plates 34 and 35 may, for instance, form part of the film gate and film pressure plates conventionally employed in motion picture projectors. The light source 42 may either be a lamp especially provided for an exposure of the photocell 37 or may be the projector lamp itself, from which light is derived for illuminating the photocell.

The light beam 41 is interrupted each time an opaque region 24 is present at the region 36. The photocell 37 is thus not exposed to light during these times. However, upon the movement of a transparent control marking 18 into the region 36, the light beam 41 is capable of reaching the photocell 37 which will thereupon provide an output signal at its terminals 44 and 45.

Since the sprocket holes 22 are also transparent, light from the beam 41 will be able to reach the photocell 37, and produce a spurious signal at the terminals 44 and 45 each time a sprocket hole is moved through the region 36. As is well known in the motion picture projector art, these sprocket hole movements occur during the intermittent film advance intervals. Between such intervals, the film is maintained stationary for the projection of an image frame. In general practice, the period of time during which the film is maintained stationary during each image frame sequence is some three to eight times longer than the period of time during which the film is advanced from one frame to the next.

Accordingly, the presence of a transparent marking 18 will result in a light exposure of the photocell 37 which is some three to eight times longer than the exposure produced by a sprocket hole 22. These circumstances permit a separation of signals produced in response to the control markings from signals produced in response to sprocket holes.

In the apparatus shown in FIG. 2, this separation is provided by an integrating circuit 49 including a capacitor 54 and resistors 46 and 47. The output of the circuit 49 is connected to a relay 48, and the circuit 49 has such a time constant that the relay 48 will only be energized in response to the presence of a control marking 18 at the photocell 37.

More specifically, the time constant of the integrating circuit 44 is such that the output pulses produced by the photocell 37 in response to the quick passage of the sprocket holes 22 through the region 36 are not able to build up a sufficient charge at the capacitor 54 for an energization of the relay 48. On the other hand, the time constant of the circuit 49 is such that the longer output signal produced by the photocell 37 in response to the presence of a control marking at the region 36 builds up a charge at the capacitor 54 sufficient to energize the relay 48, which thereupon closes its contact 50 to provide an input signal from a battery 52 to a control circuit 51.

In carrying out the subject invention, it is not absolutely necessary that each control marking extend only between two adjacent sprocket holes. To the contrary, each of the control markings 18 shown herein may extend over several sprocket holes, so as to increase the reliability with which these markings are sensed by the photocell.

In FIG. 2 for instance, an extension of the control marking 18 over three or four sprocket holes would advantageously multiply the ratio between the time in which a control marking is sensed and the time in which the photocell 37 is exposed to the light 41 through a sprocket hole passing through the region 36.

Figure 3:
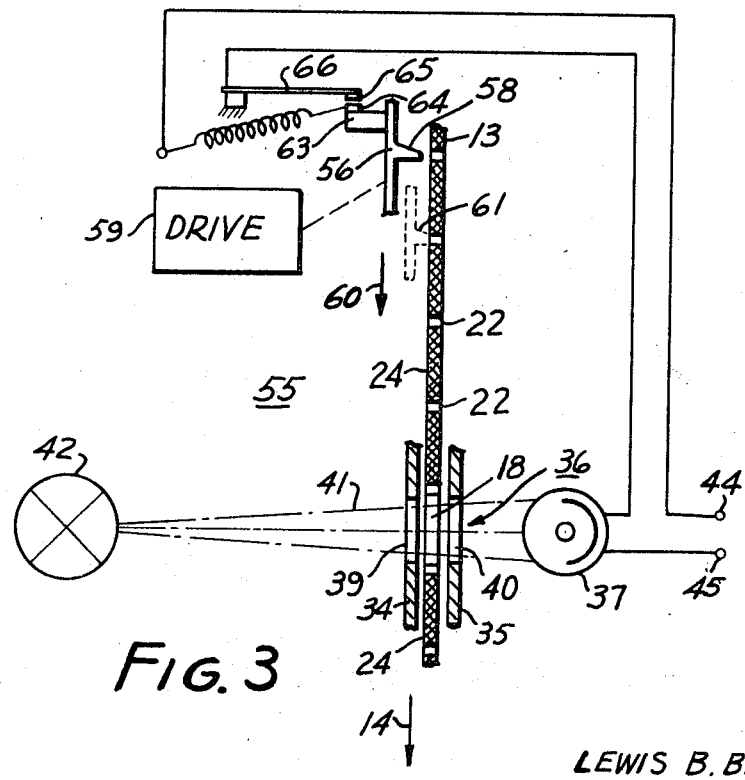
FIG. 3 illustrates a modification of the apparatus shown in FIG. 2.

The projector 55 shown in FIG. 3 is similar to the projector 33 shown in FIG. 2, so that like reference numerals are employed to designate like parts as among FIGS. 2 and 3.

The projector 55 includes a film pulldown mechanism 56 for advancing the film 13 by one frame at a time. In a conventional manner, the pulldown mechanism has a claw 58 which is inserted by a drive 59 into a sprocket hole of the film 13 and which is thereupon driven downwardly in the direction of arrow 60 to a position 61 so as to advance the film by one frame as just mentioned. After such advance, the claw is withdrawn from the sprocket hole and returned to its original position shown in solid lines in FIG. 3.

According to FIG. 3, the pulldown mechanism has an extension 63 which carries a contact 64. A further contact 65, mounted on a spring 66 engages the contact 64 when the pulldown mechanism 56 is in its illustrated rest position. In this position, the contacts 64 and 65 complete a circuit from the photocell 37 to the output terminals 44 and 45. Accordingly, an output signal produced by the photocell 37 is applied to the terminals 44 and 45 when the contacts 64 and 65 are mutually engaged.

In the view illustrated in FIG. 3, the light beam 41 passes through the transparent control marking 18 to the photocell to produce an output signal at the terminals 44 and 45. On the other hand, if any one of the opaque portions 24 is present in the region 36, no output signal appears at the latter terminals, because the photocell 37 is then not exposed to light.

However, the photocell 37 produces a signal during the periods of time in which light from the beam 41 reaches the photocell through any one of the sprocket holes 22. In the apparatus of FIG. 3, this signal is not able to reach the terminals 44 and 45, since the contact 64 moves with the pulldown mechanism 56 and is thus separated from the contact 65 whenever a sprocket hole travels through the region 36.

Accordingly, the sprocket holes 22 are not able to produce spurious signals at the terminals 44 and 45. This prevents a control circuit connected to the terminals 44 and 45 from being adversely affected in its operation by the presence of the sprocket holes.

The mechanism 56 and contacts 64 and 65 can be viewed as means for selectively switching the photocell from a first state of operation in which signals produced by the cell can reach the terminals 44 and 45, to a second state of operation in which signals produced by the cell are prevented from reaching the latter terminals.

Figure 5:
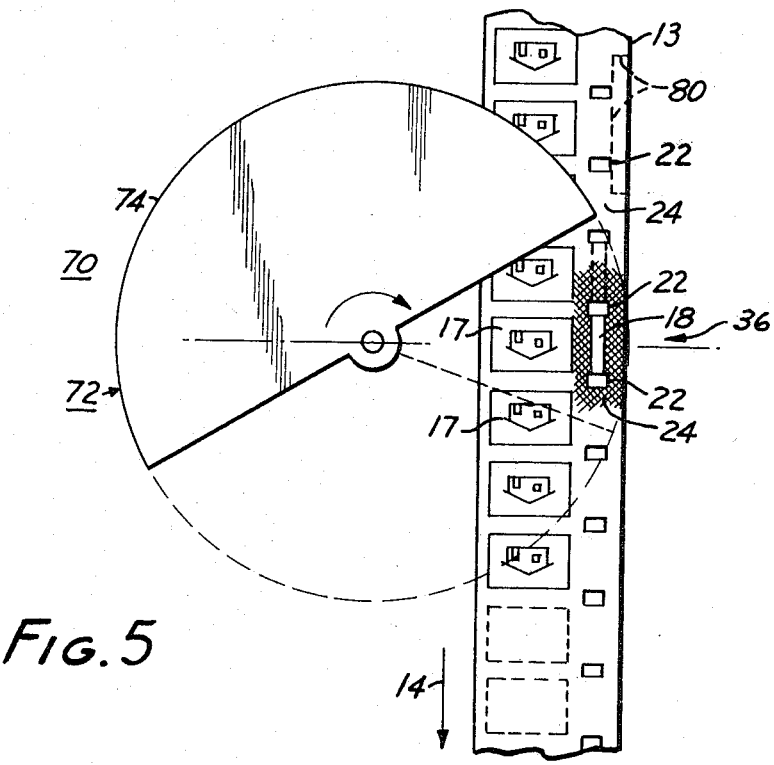
FIG. 5 shows selected parts of the apparatus illustrated in FIG. 4, when viewed along the line 5—5 in FIG. 4.
Figure 4:
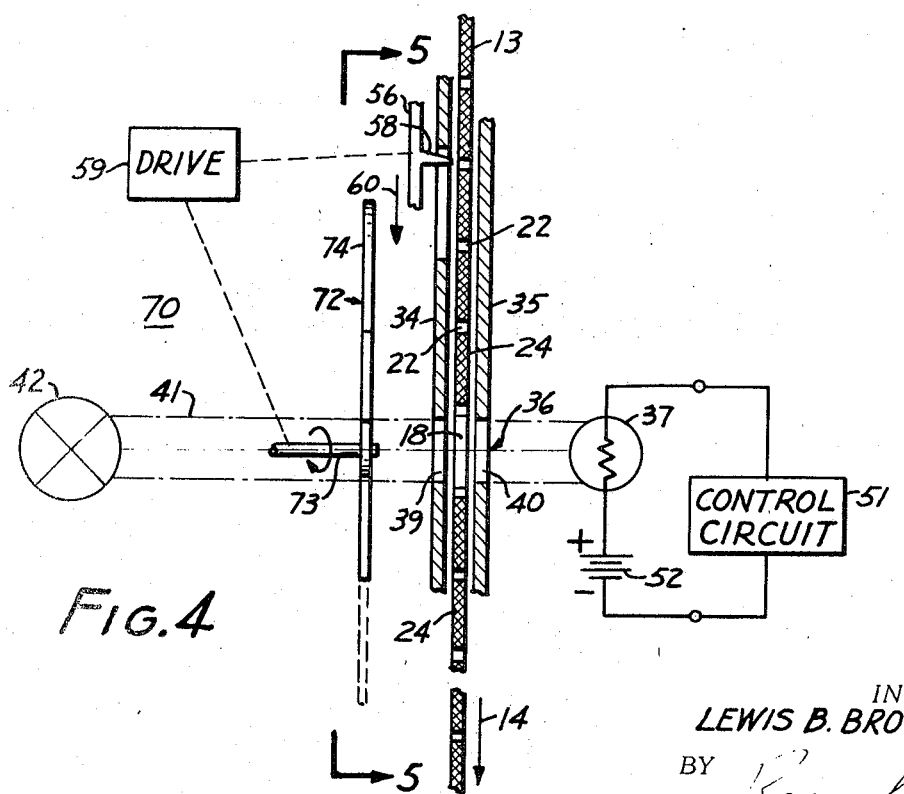
FIG. 4 illustrates a further modification of the apparatus shown in FIG. 2.

The projector 70 illustrated in FIGS. 4 and 5 is similar to the projector 55 shown in FIG. 3, so that like reference numerals are employed to designate like parts as among these figures.

According to FIG. 4, the drive 59 not only actuates the pulldown mechanism 56 in the above mentioned manner, but also rotates a sector shutter 72, mounted on a shaft 73.

In the motion picture projector art, these sector shutters are well known. While a shutter with a semi-circular sector 74 is shown in FIGS. 4 and 5, similar shutters with a plurality of sectors are also in use and may be employed in practicing the subject invention.

A shutter of the type shown in FIGS. 4 and 5 is rotated so that the image frames 17 are successively projected (one image frame at a time) while the film 13 is standing still, and so that the projection of scenery from the film is interrupted while the film is moved from one image frame to the next.

As seen best in FIG. 5, the sector 74 is dimensioned so that it not only obscures image frames during the movement of the film from one frame to the next, but also interruptes the flow of light from the source 42 to the photocell 37 through any of the sprocket holes which move through the region 36.

The photocell 37 is, however, exposed to light from the source 42 if a transparent control marking 18 has been moved into the region 36, since the shutter sector 74 moves out of the trajectory of the light beam 41 at the same time as it readmits light from the projector lamp to an image frame 17.

No light will reach the photocell 37 in the absence of a transparent control marking, since the areas 24 between the sprocket holes are opaque and since the sprocket holes 22 are obscured by the sector shutter 72 during their movement through the region 36, and are obscured by the plates 35 and 34 when the film 13 stands still.

It will now be recognized that FIGS. 4 and 5 present convenient means for distinguishing transparent control markings from sprocket holes on motion picture film or other elongated information carriers.

To provide a clearer illustration, secondary parts such as the plates 34 and 35 and the pulldown mechanism 56 illustrated in FIG. 4 have not been shown in FIG. 5.

It will also be noted that the photocell 37 has been illustrated in FIG. 4 as a photoresistive cell (a cell which lowers its resistance in response to light), while this photocell, in the FIGS. 2 and 3, has been shown as a photovoltaic cell. In practice, a photovoltaic cell may be used in the apparatus of FIGS. 4 and 5, while a photoresistive cell may be employed in the apparatus of FIG. 2 or FIG. 3.

If desired, a light source separate from the motion picture projector lamp may be used for illuminating the photocell 37 in the manner described above. However, this photocell is preferably illuminated with light produced by the projector lamp. This may be accomplished by providing the above mentioned apertures 39 and 40 in the film gate and film pressure plate so that part of the light projected against the image frame portion of the film is also projected against the sprocketed film margin. This not only makes the provision of an extra lamp unnecessary, but also materially reduces a faulty operation of the apparatus. If different lamps are used for projecting the image frames and for illuminating the photocell, the burning out of the photocell lamp may go unnoticed for longer periods of time and a prolonged inaction of the control circuit 51 may be erroneously attributed to a supposed defect in that circuit. On the other hand, a burning out of the projector lamp is readily apparent from the fact that the projector screen remains dark.

In the embodiments shown in FIGS. 2 to 5, the photocell may be enclosed in a light mask similar to the one shown at 26 in FIG. 1A, so as to avoid an exposure of the cell to light emanating from image frames.

While the subject invention has been described so far in terms of a provision or presence of transparent control marks between sprocket holes, it should be understood that the invention may also be of utility when control marks are provided laterally adjacent to sprocket holes as shown in FIG. 5 by dotted lines at 80. Even though the markings are then no longer in the direct path of the sprocket holes, stray light emanating from these holes could still influence a photocell positioned to sense the markings 80. Since the means according to the subject invention are inherently capable of eliminating the effect of sprocket holes on the operation of a sensing photocell, they are also useful in connection with markings of the type shown at 80.

While specific preferred embodiments have been described and illustrated herein, modifications within the spirit and scope of the subject invention will be apparent or will suggest themselves to those skilled in the art.

I claim:

1. In apparatus for sensing control markings located between sprocket holes of an elongated intelligence carrier, the improvement comprising:
   first means for producing electric signals in response to said markings, said first means being of a type tending to produce spurious electric signals in response to said sprocket holes; and
   second means coacting with said first means for precluding said first means from responding to said sprocket holes.

2. Apparatus as claimed in claim 1, wherein said second means includes means for periodically obscuring said sprocket holes from said first means.

3. In apparatus for sensing control markings located between sprocket holes of an elongated intelligence carrier, the improvement comprising:
   first means for producing electric signals in response to said markings, said first means being of a type tending to produce spurious electric signals in reponse to said sprocket holes;
   second means combined with said first means for suppressing a response of said first means to said sprocket holes;
   said first means are constructed to sense said markings and said sprocket holes to produce first electric signals in response to said markings and second electric signals in response to said sprocket holes;
   said second means are connected to said first means and are constructed to pass said first electric signals and to suppress said second electric signals;
   selectively actuable circuit means connected to said first means for receiving said first and second electric signals, said circuit means having a first state of operation for passing said first signals, and a second state of operation for suppressing said second signals; and
   means connected to said circuit means for switching said circuit means to said second state of operation prior to each sensing by said first means of a sprocket hole, and for switching said circuit means to said first state of operation after each sensing by said first means of a sprocket hole.

4. Apparatus as claimed in claim 3, wherein:
   (a) said first means are exposed to each of said markings for a longer time than to each of said sprocket holes, so that each of said first electric signals is of a longer duration than each of said second electric signals; and
   (b) said second means include means for distinguishing said first signals from said second signals.

5. Apparatus as claimed in claim 3, wherein:
   (a) said apparatus includes means for intermittently advancing said intelligence carrier; and
   (b) said switching means are responsive to said advancing means for temporarily switching said circuit means to said second state of operation during each advance of said film.

6. In apparatus for sensing control markings located between sprocket holes of an elongated intelligence carrier, the improvement comprising:
   first means for producing electric signals in response to said markings, said first means being of a type tending to produce spurious electric signals in response to said sprocket holes;
   second means combined with said first means for suppressing a response of said first means to said sprocket holes;
   said first means include means for generating electric signals in response to light, and means for projecting a beam of light to said signal generating means;
   said apparatus include means for serially moving said markings and said sprocket holes through a trajectory of said beam of light; and
   said second means include means for interrupting said beam of light during each movement of a sprocket hole through said trajectory.

7. In apparatus for displaying pictorial presentations recorded in image frames on a film having sprocket holes, and for sensing control markings located on said film between sprocket holes, the improvement comprising:
   (a) means for advancing said film with said image frames thereby serially moving said markings and said sprocket holes past a predetermined location;
   (b) sensing means including means situated at said predetermined location for sensing said control markings at said predetermined location; and
   (c) means combined with said sensing means for suppressing the operation of said sensing means during each movement of a sprocket hole past said predetermined location.

8. Apparatus as claimed in claim 7, wherein:
   (a) said advancing means include means for intermittently advancing said film by the height of an image frame; and
   (b) said suppressing means include means responsive to operation of said intermittent advancing means for interrupting the operation of said sensing means during each advancing operation of said film.

9. Apparatus as claimed in claim 7, wherein:
   (a) said advancing means include means for intermittently advancing said film by the height of an image frame;
   (b) said sensing means include means for generating electric signals in response to light, and means for projecting a beam of light through said control markings to said signal generating means; and
   (c) said suppressing means include means for interrupting said beam of light during each advancement of said film.

10. Apparatus as claimed in claim 9, wherein:
    (a) said advancing means include means for intermittently advancing said film by the height of an image frame;
    (b) said apparatus includes shutter means for obscuring an image frame during an advancement of said film; and
    (c) said light interrupting means include part of said shutter means.

11. In apparatus for displaying pictorial presentations recorded in image frames on a film having sprocket holes, and for sensing control markings located on said film between sprocket holes, the improvement comprising:

(a) means for advancing said film to move said image frames serially through a first predetermined region, and to move said markings and said sprocket holes serially through a second predetermined region;

(b) means for passing light through said first and second regions;

(c) sensing means for sensing light passing through said second region to sense said control markings; and (d) shutter means for obscuring said light at said first and second regions during each advancement of an image frame, whereby a passage of light to said sensing means through any of said sprocket holes is prevented.

12. In apparatus for displaying pictorial presentations recorded on film provided with recurring light-transmitting regions, and for sensing control markings located on said film adjacent some of said light-transmitting regions, the improvement comprising:

(a) means for intermittently advancing said film thereby serially moving said control markings and said control markings and said light-transmitting regions past a predetermined location;

(b) sensing means including means situated at said predetermined location for sensing said control markings at said predetermined location, said sensing means being of a type tending to respond to said light-transmitting regions during a movement of said light-transmitting regions past said predetermined location; and (c) means combined with said sensing means for precluding said sensing means from responding to said light-transmitting regions.

13. Apparatus as claimed in claim 12, wherein:

(a) said light-transmitting regions are sprocket holes in said film; and (b) said means combined with said sensing means are constructed to preclude said sensing means from responding to said sprocket holes.

References Cited

UNITED STATES PATENTS

| | | | |
|---|---|---|---|
| 1,921,494 | 8/1933 | Wildhaber | 352—5 |
| 2,052,792 | 9/1936 | Owens | 352—24 |
| 2,199,559 | 5/1940 | Dawson. | |
| 2,277,438 | 3/1942 | Humphreys | 352—92 |
| 2,322,435 | 6/1943 | Goshaw. | |

JULIA E. COINER, Primary Examiner

U.S. Cl. X.R.

352—236